Nov. 28, 1933.  E. J. REISDORF  1,936,857
COFFEE PROTECTOR
Filed Feb. 9, 1933
Fig. 1.
Fig. 2.
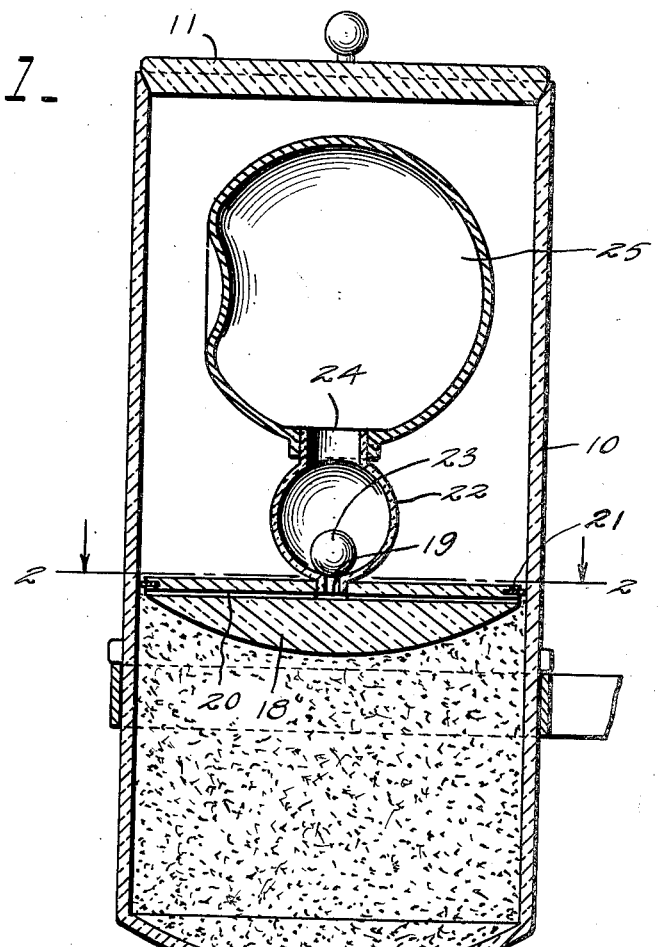
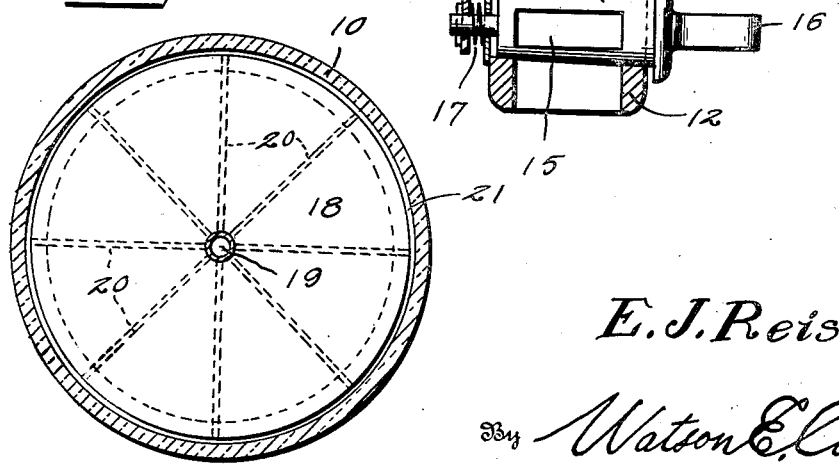
Inventor
E. J. Reisdorf
By Watson E. Coleman
Attorney Patented Nov. 28, 1933

1,936,857

UNITED STATES PATENT OFFICE 1,936,857

COFFEE PROTECTOR

Edward J. Reisdorf, Seattle, Wash.

Application February 9, 1933. Serial No. 656,009

8 Claims. (Cl. 221—146)

This invention relates to containers for containing coffee or other comminuted products and particularly to a container designed for domestic use into which the coffee or other material may be poured and then used from time to time as desired.

The general object of the invention is to provide a container of this character so designed that coffee or other material may be retained therein free from access of air.

A further object is to provide a container of this character by which the air is automatically withdrawn from the interstices between the coffee grains and the coffee kept packed in a small space, the coffee isolated from contact with outside influences which would tend to cause its deterioration.

A further object is to provide a container of this character which includes a discharge valve whereby the coffee may be dispensed, a follower resting upon the coffee and which has more or less air-tight contact with the wall of the container, and means for withdrawing the air from the coffee.

Other objects will appear in the course of the following description.

My invention is illustrated in the accompanying drawing, wherein:—

Figure 1 is a vertical sectional view of a dispensing receptacle constructed in accordance with my invention and showing the air exhausting ball incompletely deflated;

Figure 2 is a section on the line 2—2 of Figure 1.

10 designates the container itself which is preferably of glass, though other material might be used. This container will normally be 4½ inches in diameter and about fourteen inches high. The inside of the container is to be smooth and of uniform diameter and the top is preferably covered by an air-tight cap 11. The lower end of the container is formed with a discharge neck 12 having a passage 13 through it within which is disposed the rotatable discharge valve 14 having a discharge opening 15 and on its exterior having a head 16 whereby the valve may be manipulated. The valve is preferably slightly tapered so as to insure perfect contact with its seat and no leakage. A spring washer 17 may be used for keeping the valve tight. This valve is preferably made of glass.

Disposed within the container 10 is a weighted follower 18 preferably made of glass and having its bottom convexly rounded so as to fill any hollow caused by the withdrawal of the coffee through the valve, thus keeping the coffee closely packed.

This follower which also acts as an air ejector is provided at its center with an opening 19 and leading from this opening are a plurality of passages 20 opening upon the periphery of the ejector. The ejector is less in diameter than the interior of the container so that these passages are always open. Above these passages, however, the ejector or follower is grooved to carry the packing ring 21 which bears against the inner face of the container. The ejector is formed with or carries an approximately spherical valve casing 22 within which is disposed the ball valve 23 normally closing the opening 19. The valve casing is provided with a neck 24 and engaged with this neck is a rubber bulb 25 which is designed for the purpose of withdrawing air from the interior of the container or from the coffee therein. The ball 23 may be made of metal, glass or any other suitable material as may the casing 22.

In the use of this invention, the follower and ejector 18 is removed from the interior of the container and coffee poured therein. The rubber bulb 25 is removed from the container and the follower is then disposed on top of the coffee. This allows the air to pass freely through the follower and through its valve casing 22. After the follower has been pressed downward on the coffee, then the bulb 25 is deflected and placed in position so that as it expands, it will draw air out through the ducts 19 and 20 and from the space below the member 18 and from the interstices between the coffee grains. It is obvious that when the coffee is poured into the container and the follower inserted and the container closed by the cap 11, the valve 14 is closed. With this construction, the coffee is kept sterilized because the air is withdrawn therefrom and no outside air can come in contact with the coffee so as to cause its deterioration and no foreign matter can come in contact with the coffee.

Therefore, the coffee in the lower portion of the container is kept perfectly pure. From time to time as the coffee is to be used, the valve 14 is opened and the coffee allowed to discharge the follower 18 moves fast as the coffee discharges the follower 18 moves downward within the container and if there is any air admitted, the bulb 25 will tend to expand, because it has only partially expanded at the time when the air was withdrawn from the interstices of the coffee, thus constantly withdrawing air from the coffee after each opening of the valve.

Preferably the container is to be sterilized whenever it is to be filled with coffee. The coffee is kept in a compact airless condition down to the last portion remaining in the container. The device can be manufactured and distributed at a relatively low cost and the coffee is entirely protected at all times.

I do not wish to be limited to the details of construction except as defined in the appended claims.

The rubber bulb 25 will be so strongly constructed that the deflation for days at a time will not affect its strength.

I claim:—

1. A coffee dispenser of the character described, comprising a container having a discharge neck, the neck having a valve, a follower disposed within the container and movable downward therein against the coffee in the lower portion thereof, the follower having air-tight engagement with the wall of the container, and means carried by the follower for withdrawing air from the space below the follower and from the coffee contained in said space.

2. A coffee dispenser of the character described, comprising a container having a discharge neck, the neck having a valve, a follower disposed within the container and movable downward therein against the coffee in the lower portion thereof, the follower having air-tight engagement with the wall of the container, and a deflatable bulb connected to the follower and communicating with the space below the same whereby air may be drawn from the space blow the follower and from the coffee contained therein.

3. A dispenser of the character described, comprising a container having a discharge mechanism at its lower end, a follower movable downwardly within the container and having a packing ring engaging the inside face of the container, the follower having ducts opening upon the peripheral face of the follower and below the packing ring, a deflatable bulb operatively connected to the ducts of said follower whereby air within the space below the follower may be withdrawn.

4. A dispenser of the character described, comprising a container having a discharge mechanism at its lower end, a follower movable downwardly within the container and having a packing ring engaging the inside face of the container, the follower having ducts opening upon the peripheral face of the follower and below the packing ring, a valve casing above the follower and connected to said ducts and having a downwardly closing valve therein, and a deflatable bulb connected to the valve casing whereby the air may be withdrawn from the valve casing and the interior of the container below the follower.

5. A dispenser of the character described, comprising a container having a discharge mechanism at its lower end, a follower movable downwardly within the container and having a packing ring engaging the inside face of the container, the follower having ducts opening upon the peripheral face of the follower and below the packing ring, an approximately spherical valve casing connected to the follower and communicating with said ducts, a ball valve in said casing normally closing communication between the ducts and the casing, and a rubber bulb secured to said valve casing and adapted to be initially deflated and then as it expands withdraw air from the interior of the container below the follower.

6. A container of the character described having discharging means at its lower end and closed at its upper end, a follower disposed within the container and resting on the material therein and moving downward as the material is discharged, and means disposed within the upper portion of the container for withdrawing air from the material below said follower.

7. A container of the character described having discharge means at its lower end and closed at its upper end, and means disposed entirely within the upper portion of the container for abstracting air from the material within the container.

8. A container of the character described having discharge means at its lower end and closed at its upper end, a follower fitting the container and adapted to rest upon the material within the container and follow down as said material is discharged, the follower having openings leading into the space below the follower, and means carried by said follower for withdrawing air from the material below the follower.

EDWARD J. REISDORF.